United States Patent [19]
Gola et al.

[11] Patent Number: 5,430,094
[45] Date of Patent: Jul. 4, 1995

[54] WATER-BASED VACUUM FORMING LAMINATING ADHESIVE

[75] Inventors: Edward F. Gola, Allison Park, Pa.; Michael A. Misiak, Lake Orion, Mich.

[73] Assignee: PPG Industries, Inc., Pittsburgh, Pa.

[21] Appl. No.: 728,483

[22] Filed: Jul. 11, 1991

[51] Int. Cl.6 .......................... C08J 3/00; C08K 3/20; C08L 75/00
[52] U.S. Cl. .................................. 524/507; 524/591; 524/840; 528/53
[58] Field of Search ....................... 524/507, 591, 840; 528/53

[56] References Cited

U.S. PATENT DOCUMENTS

| | | | |
|---|---|---|---|
| 4,013,480 | 3/1977 | Chumbley et al. | 528/288 |
| 4,762,880 | 8/1988 | Leung | 524/591 |
| 4,853,061 | 8/1989 | Leung | 524/853 |
| 4,992,507 | 2/1991 | Coogan et al. | 524/591 |

FOREIGN PATENT DOCUMENTS 64-26689  1/1989  Japan .

*Primary Examiner*—Paul R. Michl
*Assistant Examiner*—P. Niland
*Attorney, Agent, or Firm*—William J. Uhl

[57] ABSTRACT

A water-based vacuum forming laminating adhesive is disclosed. The adhesive includes a vinyl acetate polymer, an ionic water-dispersed polyurethane, and an aziridine. The composition is also substantially free of potentiometrically titratable acid. Also disclosed is a process for adhering a thermoplastic material to a rigid substrate. This process includes applying the above-described adhesive composition to the substrate, drying the composition, heating the thermoplastic material, contacting the thermoplastic material to the dry composition, and applying a vacuum to the thermoplastic material and the substrate for at least about; 10 seconds so as to adhere the thermoplastic material to the substrate. The composition of the present invention is particularly stable and can be used as a one component adhesive for up to 90 days.

20 Claims, No Drawings

WATER-BASED VACUUM FORMING LAMINATING ADHESIVE

FIELD OF THE INVENTION

The present invention relates to a water-based vacuum forming laminating adhesive. The adhesive is particularly stable and useful for lamination of vinyl films in the automotive and furniture industries.

BACKGROUND OF THE INVENTION

The use of vacuum forming is a recognized process, particularly in the automotive industry. For example, automobile surfaces such as consoles, dashboards, door panels and other interior surfaces can be covered with a thermoplastic material. The substrates can be any commonly known materials, such as acrylonitrile-butadiene-styrene terpolymer (ABS) or fiberboard. The process includes coating the substrate with a laminating adhesive, heating a thermoplastic material, such as a polyvinyl chloride flexible trim vinyl, past its softening point and draping the flexible vinyl onto the substrate. A vacuum is then applied through the substrate to pull the flexible vinyl in a contoured fashion onto the substrate.

Use of organic solvent-based adhesives in vacuum forming is common in the industry. However, such adhesives present work hazards typically associated with organic solvents. A water-based thermoforming adhesive is disclosed in U.S. Pat. Nos. 4,762,880 and 4,853,061. These patents disclose the use of an adhesive having an aqueous aromatic polyurethane emulsion or dispersion, a water dispersible crosslinking agent, such as an unblocked organic isocyanate compound. The compositions disclosed in these patents are only stable for several hours and within about seven hours, recognizable performance decreases are observed. Stability of adhesive compositions is an important factor in determining their usefulness. For example, compositions having stability comparable to those disclosed in the above-identified patents must be stored in such a manner that the reactive components are separate and only mixed immediately prior to application. Such handling requirements impose additional costs in use. Moreover, such compositions are particularly uneconomical, if for example, a stoppage is encountered on a production line. In such an instance, an entire batch of adhesive can react sufficiently during the delay to require disposal of the batch.

In view of the foregoing discussion, there is a need for a single package water-based vacuum forming laminating adhesive composition which is highly stable and provides excellent adhesive properties.

SUMMARY OF THE INVENTION

The present invention is directed toward a stable water-based adhesive composition. This composition includes a vinyl acetate polymer, an ionic water-dispersed polyurethane, and an aziridine. The composition is characterized as being substantially free of potentiometrically titratable acid. More specifically, the composition has less than about 0.2 milliequivalents of potentiometrically titratable acid. The composition is stable for over 30 days at 23° C. In further embodiments, the composition also includes butyl benzene sulfonamide, carbodiimide, and/or propylene glycol.

The invention is also directed toward a process for adhering a thermoplastic material to a rigid substrate which includes applying a composition, as described above, to a rigid substrate. The process further includes drying the composition, heating the material and contacting the material to the dried composition. A vacuum is then applied to the material for at least about 10 seconds to adhere the thermoplastic material to the rigid substrate.

DETAILED DESCRIPTION OF THE INVENTION

The vinyl acetate polymer of the present invention can be polyvinyl acetate, or a polymer derived from polyvinyl acetate such as a polyvinyl alcohol produced by alcoholysis of a polyvinyl acetate, or a polyvinyl acetal produced by condensation of a polyvinyl alcohol with an aldehyde, acetaldehyde, formaldehyde or butyraldehyde. The polyvinyl acetals include polyvinyl acetal, polyvinyl formal, and polyvinyl butyral. The vinyl acetate polymer of the present invention also includes copolymers produced from vinyl acetate monomers and other monomers. For example, such comonomers include alpha olefins such as ethylene, acrylates such as methyl acrylate, maleates such as diethylmaleate, fumarates such as dimethylfumarate and vinyl monomers such as vinyl chloride. Polymerization of vinyl acetate and of vinyl acetate and copolymerizable monomers can be conducted by methods known in the art. For example, bulk and solution polymerization, emulsion polymerization and suspension polymerization can be used.

The preferred vinyl acetate polymer of the present invention is a vinyl acetate homopolymer. The vinyl acetate polymer of the present invention is typically present in the composition in an amount between about 8 weight percent and about 48 weight percent, more preferably between about 18 weight percent and about 38 weight percent, and most preferably between about 24 weight percent and about 32 weight percent based on total weight of resin solids.

A suitable vinyl acetate homopolymer commercially available is known as RHOPLEX VA 2113, from Rohm and Haas. RHOPLEX VA 2113 is a vinyl acetate homopolymer emulsion with a solids content of 55%, a pH at 25° C. of 4.5, a viscosity at 25° C. of 1100 cps., an average particle size of 0.20 microns, a specific gravity of emulsion at 25° C. of 1.11, and a Tg of 29° C.

The present composition also includes an ionic water-dispersed polyurethane. The polyurethane can be cationic or anionic, and preferably is anionic. The polyurethane resin of the present composition can be prepared by methods known in the art and is typically prepared by reaction of a polyisocyanate with a polyfunctional hydroxy compound.

The polyisocyanates for preparing the polyurethane resin of the present invention can be aliphatic or aromatic isocyanates. Representative examples are the aliphatic isocyanates such as trimethylene, tetramethylene, pentamethylene, hexamethylene, 1,2-propylene, 1,2-butylene, 2,3-butylene, and 1,3-butylene diisocyanates; the cycloalkylene compounds such as 1,3-cyclopentane, 1,4-cyclohexane, 1,2-cyclohexane diisocyanates and isophorone diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the nuclear-substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-dimethyldiphenyl methane-2,2',5,5'-tetraisocyanate; the polymerized polyisocyanates such as tolylene diisocyanate dimers and trimers, and the like.

The polyfunctional hydroxy compound useful in preparing a polyurethane resin for the present composition is typically a hydroxyl terminated polyether or polyester. The polyethers are typically poly(oxyalkylene) derivatives of polyhydric alcohols, such as glycerol, trimethylolpropane, 1,2,6-hexanetriol, sorbitol, mannitol, pentaerythritol or sucrose. Suitable polyesters are typically prepared from reaction of a carboxylic acid and a polyol, for example, reaction between adipic acid or phthalic acid and ethylene glycol, propylene glycol, 1,3-butylene glycol, 1,4-butylene glycol, diethylene glycol, 1,2,6-hexanetriol, trimethylolpropane, or trimethylolethane.

The polyurethane prepared by reacting a polyisocyanate with a polyfunctional hydroxy compound also contains ionic groups to make the polyurethane water dispersible. In the case of an anionic resin, the ionic groups are acid salt groups which can be selected from the class consisting of —OSO$_3^-$, —OPO$_3^=$, COO$^-$, SO$_2$O$^-$, POO$^-$ and PO$_3^=$. The polyurethane can be prepared with reactants containing the acid salt group, or, as is more normally the case, can be prepared with free acid groups which can be subsequently neutralized. Typically, the polyurethane is prepared having isocyanate groups for reaction with materials which contain at least one active hydrogen atom reactive with isocyanate groups or at least one isocyanate group, and at least one group capable of salt formation. Preferably, the acid group is in the active hydrogen material because isocyanates containing acid groups are not stable.

Specific examples of compounds which contain active hydrogens and acid groups capable of salt formation are hydroxy and mercapto carboxylic acid. Examples include dimethylol propionic acid, glycollic acid, thioglycollic acid, lactic acid, malic acid, dihydroxy malic acid, tartaric acid, dihydroxy tartaric acid, and 2,6-dihydroxybenzoic acid. Other examples of compounds which contain active hydrogens and acid groups are aminocarboxylic acids, aminohydroxy carboxylic acids, sulfonic acids, hydroxy sulfonic acids and aminosulfonic acids. Examples include oxaluric acid, anilido acetic acid, glycine, alpha-alanine, 6-amino caproic acid, reaction product of ethanolamine and acrylic acid, hydroxy ethyl propionic acid, 2-hydroxyethane sulfonic acid and sulphanilic acid. As mentioned above, amino acids must be used in the presence of a base such as KOH or a tertiary amine. Other examples include bis-hydroxymethylphosphinic acid, trimethylol propane monophosphate and monosulfate, N-hydroxyethylaminoethylphosphonic acid.

Suitable salt forming agents for acid group-containing compounds include inorganic and organic bases such as sodium hydroxide, potassium hydroxide, ammonia and tertiary amines.

Besides acid salt groups which are anionic and are preferred, the polyurethane can contain cationic salt groups which can be selected from the class consisting of

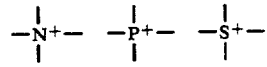

and mixed groups. The polyurethane can be prepared with reactants containing the cationic salt groups, or as is more normally the case, polyurethanes containing suitable precursors can be converted to the cationic salt by adding a quaternizing or neutralizing agent to the prepolymer. Suitable materials for introducing cationic groups into the polyurethane are materials which contain at least one active hydrogen atom reacted with isocyanate groups, or at least one isocyanate group and at least one group capable of cationic salt formation.

The polyurethane resin of the present composition is typically present in the composition in amounts of between about 24 weight percent and about 64 weight percent, more preferably between about 34 weight percent and about 54 weight percent, and most preferably between about 40 weight percent and about 48 weight percent based on total weight of resin solids.

A preferred polyurethane resin is DISPERCOLL E-585 which is available from Mobay Corporation, Pittsburgh, Pa. DISPERCOLL E-585 is an aqueous dispersion of an anionic polyester urethane derived from hexamethylene diisocyanate and isophorone diisocyanate and a polyester polyol. DISPERCOLL E-585 has a solids content of about 40%, a dispersion specific gravity at 23° C. of about 1.05 gram/cm$^3$, a viscosity at 23° C. of about 100 cps., a pH of about 7.0, an average particle size of 70 nm, and an organic solvent content of about 1% toluene.

The present composition further includes an aziridine compound. The aziridine compound provides improved heat resistance to the composition, particularly at about 180° F. and higher. As used herein, the term aziridine refers to any alkyleneimine and includes any compound based on the following structure:

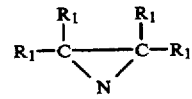

where R$_1$ is hydrogen, an alkyl radical having 1 to 3 carbon atoms, phenyl or combinations thereof.

Preferably, the aziridine is based on the following structure:

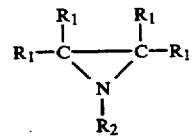

wherein R$_1$ is as described above and R$_2$ is hydrogen or an alkylene radical having 1 to 4 carbon atoms. Such aziridines include ethyleneimine, ethyl ethyleneimine and propyleneimine. The aziridine compound of the present invention also includes polyfunctional aziridines. Particularly useful polyfunctional aziridines include trimethylolpropane-tris-(B-(N-aziridinyl) propionate) and pentaerythritol-tris-(B-(N-aziridinyl)propionate). The aziridine compound of the present invention is typically present in the composition in amounts between about 0.5 weight percent and about 9 weight percent, more preferably between about 1.6 weight percent and about 6.1 weight percent, and most preferably between about 2 weight percent and about 4.6 weight percent based on total weight of resin solids.

The two polyfunctional aziridine Curing agents specified above are available commercially from Virginia Chemicals of Portsmith, Va. as XAMA-2 and XAMA-7, respectively. XAMA-2 has a solids content of 100%, an aziridine content of 6.00 to 7.00 meg/gram, an aziridine functionality of about 2.7, a density at 25° C. of 1.109 grams/ml., a viscosity at 25° C. of 125–500 cps., a freezing point of less than −15° C., a vapor pressure of less than 0.1 mm, and a solubility in water of 6.5 weight %. XAMA-7 has a solids content of 100%, an aziridine content of 6.35–6.95 meg/gram, an aziridine functionality of about 3.3, a density at 25° C. of 1.185 grams/ml., a viscosity at 25° C. of 1200–2000, a freezing point of less than −10° C., and is completely miscible in water.

The present composition is also characterized as being substantially free of potentiometrically titratable acid. Without intending to be bound by theory, it is believed that this characteristic of the composition is important in its stability because the presence of significant amounts of potentiometrically titratable acid would be likely to cause the aziridine to react rapidly resulting in unacceptable increases in viscosity. By being substantially free of potentiometrically titratable acid, the present composition is stable over long periods of time, as discussed more fully below. As used herein, the term substantially free of potentiometrically titratable acid refers to a composition in which the amount of potentiometrically titratable acid is sufficiently low that the composition meets the stability parameters discussed below. More particularly, the term refers to a composition having less than about 0.2 milliequivalents of potentiometrically titratable acid, more particularly less than about 0.1 milliequivalents of potentiometrically titratable acid, and most particularly less than about 0.05 milliequivalents of potentiometrically titratable acid.

The term potentiometrically titratable acid refers to standard procedures of potentiometric titration of a solution to determine the amount of acid in the solution. Such procedures typically measure the electric potential in a solution as base is added to the solution until the acid/base equivalence point is reached. This point is indicated by rapid changes in the potential in the region of the equivalence point.

The present composition also optionally includes other additives. One such additive is a butyl benzene sulfonamide plasticizer. This compound and other similar compounds are useful as wetting agents and to improve flow of the composition. Typically, the butyl benzene sulfonamide plasticizer is present in the composition in amounts between about 7 weight percent and about 33 weight percent, more preferably between about 14 weight percent and about 30 weight percent, and most preferably between about 18 weight percent and about 26 weight percent based on total weight of resin solids. A commercially available butyl benzene sulfonamide plasticizer is available from The C. P. Hall Company as PLASTHALL BSA, which has a solids content of 100%.

A further additive which can be included in the present composition is a carbodiimide which is a wetting agent and provides better coverage of the composition on a substrate. As used herein, the term carbodiimide refers to carbodiimide and substituted carbodiimides. Typically, a carbodiimide is present in the composition in amounts between about 0.5 weight percent and about 9 weight percent, more preferably between about 1.6 weight percent and about 6.1 weight percent, and most preferably between about 2 weight percent and about 4.6 weight percent based on total weight of resin solids. A commercially available carbodiimide is available from Union Carbide and is identified as UCARLNK XL 29SE which has a solids content of 50%.

The present composition can also optionally include propylene glycol and other similar compositions for use as plasticizer. Typically, propylene glycol, when used, is present in the composition in amounts between about 0.5 weight percent and about 6 weight percent, more preferably between about 1 weight percent and about 5 weight percent, and most preferably between about 2 weight percent and about 4 weight percent based on total weight of resin solids.

As discussed above, the present composition is a water based adhesive composition. Typically, the composition includes water in an amount of between about 25 weight percent and about 75 weight percent, more preferably between about 40 weight percent and about 60 weight percent, most preferably between about 45 weight percent and about 53 weight percent based on total weight of the composition.

As discussed above, the present composition is stable. In particular, it is sufficiently stable to be useful as a single-component or "one pack" adhesive in which all of the components are combined substantially prior to application without gelation of the composition and without unacceptable increases in viscosity before use. Once a composition gels, it is no longer possible to use it as an adhesive. If the viscosity of a composition increases to the point of encountering sprayability problems, but the composition is not gelled, additional solvent can be added to reduce viscosity to acceptable levels.

Stability can be measured as an increase in viscosity over time at a given temperature. Various standard tests for measuring viscosity can be used. For example, a Brookfield viscometer measures the resistance encountered by a spindle being rotated through a container of material being evaluated.

The stability of a composition for use as a single-component composition can be evaluated by comparison of the viscosity of a fresh composition against the same composition after a given time at a given temperature. The composition of the present invention is formulated such that with an initial viscosity of about 7000–9000 centipoise (CPS), after about 30 days, more preferably after about 60 days and most preferably after about 90 days at ambient temperature the composition has less than about a 50% gain in viscosity, more preferably less than about a 35% gain and most preferably less than about a 25% gain, the viscosity being measured with a Brookfield viscometer with a number 5 spindle. Ambient temperature is considered to be less than about 28° C. and more typically at about 25° C. It should be noted that stability of the present composition is determined at ambient temperatures and that, at accelerated times and temperatures, it may not achieve high stability characteristics.

The present invention is also directed toward a process for adhering thermoplastic material to a rigid substrate using the above-described water-based adhesive composition. Although a preferred embodiment of the present process is for adhering thermoplastic material to structural parts in automobiles, the process is useful in applying material to virtually any structural or decorative substrate. Typically, the substrate can be acrylonitrile-butadiene-styrene terpolymers (ABS), high impact polystyrene (HIPS), styrene-acrylonitrile copolymers (SAN), polyvinyl chloride (PVC or "vinyl"), polycarbonate (PC), high density polyethylene (HDPE), polyphenylene oxide (PPO) and fiberboard.

The thermoplastic material can be any such material known to those skilled in the art. Such material includes, without limitation, polyvinyl chloride, polyolefin, cloth, and polyurethane.

The process includes applying the composition of the present invention to the substrate. Application can be achieved in any manner known to those skilled in the art, and includes, for example, spraying the adhesive onto the substrate. The adhesive is typically applied at film thicknesses of between about 1 mils and about 15 mils, and more typically between about 3 mils and about 7 mils.

The composition is then dried on the substrate. Drying can be achieved by allowing the coated substrate to air dry at room temperature or by actively drying the composition with elevated temperatures. Depending on the temperature, humidity, and film thickness, drying of the composition on the substrate can take from several minutes to one hour or more. For example, a film at a thickness of about 5 mils can be dried in a 70° C. oven in about between 3 to 5 minutes.

After drying the composition or during the drying of the composition, the flexible material to be laminated to the substrate is heated to soften the material. Typically, the material is heated to a temperature of between about 110° C. and about 180° C. The heated material is then contacted to the dried composition. Most typically, the material is contacted by draping the heated flexible material onto the substrate.

A vacuum is then applied to the flexible material over the substrate to draw the material into all recessed areas of the substrate. Typically, the vacuum is drawn for at least about 10 seconds. In the case of substrates which are not porous, holes are made in the substrate so that a vacuum can pull the flexible material onto the substrate. In the case of porous materials, such as fiberboard, a vacuum can be achieved directly through the substrate without placing holes in the substrate.

Subsequent to application of a vacuum, the present composition will cure at room temperature in about 8-16 hours. Cure can be accelerated by heating the laminated substrate. By curing is meant evaporation of water and other diluents and the development of physical and chemical properties in the resultant film such as tensile strength and elongation.

The following examples are provided to illustrate the present invention and are not intended to limit the invention beyond the scope of the claims.

EXAMPLE 1

Four vacuum forming adhesive formulations in accordance with the present invention were prepared as indicated in Table 1. The ingredients were added serially in the order shown with mixing. All four formulations were substantially free of potentiometrically titratable acid.

TABLE 1

Adhesive Formulations

| | Parts by Weight | | | |
|---|---|---|---|---|
| | A | B | C | D |
| Polyurethane Resin(1) | 35 | 35 | 35 | 35 |
| Polyvinylacetate Latex(2) | 16 | 16 | 16 | 16 |
| Butyl benzene sulfonamide plasticizer(3) | 7 | 7 | 7 | 7 |
| Aziridine(4) | 1 | 1 | 1 | 1 |
| Carbodiimide | 2 | 0 | 2 | 2 |
| Propylene glycol | 1 | 1 | 0 | 1 |
| Thickener(5) | .5 | .5 | .5 | .0 |

(1)DISPERCOLL E-585, 40 weight percent ionic dispersed polyurethane resin in water, available from Mobay Corporation.
(2)RHOPLEX VA 2113, 55 weight percent polyvinylacetate latex in water available from Rohm and Haas.
(3)PLASTHALL BSA butyl benzene sulfonamide plasticizer available from The C. P. Hall Company.
(4)XAMA-2, trimethyolpropane-tris-(B-(N-aziridinyl)propionate), available from Virginia Chemicals.
(5)RHOPLEX QR 708, an associative thickener available from Rohm and Haas.

EXAMPLE 2

Tensile strength and elongation of formulations A-D were tested with an INSTRON Tester. Each formulation was applied to a pair of jaws and incubated at 25° C. for 30 minutes at a thickness of about 3 mils. The jaws were then separated at a controlled rate of five inches per minute. The results are shown below in Table 2.

TABLE 2

Tensile Strength/Elongation
(Jaw Separation - 5 inches/minute)

| Formulation | Tensile Strength (PSI) | Elongation (%) |
|---|---|---|
| A | 337 | 821 |
| B | 282 | 769 |
| C | 336 | 782 |
| D | 362 | 859 |

EXAMPLE 3

Formulations A-D were tested for Deadweight Peel and Hunter Peel. Each formulation was drawn-down over a 3 inch×5 inch Ford ABS panel at a dry film thickness of 3 mils. Vinyl strips measuring 1 inch×7 inches were then heated in a 138° C. oven for 40 seconds and laminated to the adhesive on the ABS panel. Laminates were held at room temperature for 72 hours prior to testing. Deadweight and Hunter Peel results are shown in Table 3.

In the Deadweight Peel procedure, a portion of the vinyl is peeled back and the panel is positioned such that the peeled vinyl can hang down. A 200 gram weight is attached to the end of the peeled vinyl at 85° C. for 8 hours. The length of additional vinyl peeled after this time is measured.

In the Hunter Peel procedure, the vinyl strip on a laminated panel is lifted and pulled back in a direction parallel to the surface of the substrate with increasing force until the vinyl peels from the panel. The test results indicate the minimum force necessary to peel vinyl at a given temperature.

TABLE 3

Deadweight and Hunter Peel

| Formulation | Deadweight (200 grams at 85° C. for 8 hours) | Hunter Peel (lbs linear inch) | |
|---|---|---|---|
| | | 25° C. | 85° C. |
| A | 0.4 inches | 13.3 | 8.2 |

TABLE 3-continued

| | Deadweight and Hunter Peel | | |
|---|---|---|---|
| | Deadweight (200 grams at 85° C. | Hunter Peel (lbs linear inch) | |
| Formulation | for 8 hours) | 25° C. | 85° C. |
| B | 0.3 inches | 13.0 | 8.0 |
| C | 0.4 inches | 13.9 | 8.4 |
| D | 0.5 inches | 14.1 | 7.8 |

EXAMPLE 4

Formulations A-D were tested for heat resistance performance in deep draw areas and on edges. U-shaped ABS panels with regular patterns of holes were brush coated with formulations A-D and allowed to dry. A vinyl sheet was heated at 138° C. for 40 seconds and draped over each ABS panel. A vacuum was applied through the holes in the panels to contact the vinyl to the substrates. The laminated substrates were kept at room temperature for 72 hours. The panels were then heated at 85° C. for 7 days and adhesion evaluated. A rating of excellent refers to uniform smooth adhesion on the entire substrate area without loss of adhesion in deep draw areas. The results are shown below in Table 4.

TABLE 4

| | Heat Resistant Adhesion | | |
|---|---|---|---|
| For-mula-lation | Initial Vinyl Adhesion (immediately upon contact) | Vinyl Adhesion after 7 days at 85° C. | |
| | | Deep Draw Areas | Edges |
| A | Excellent | Excellent | Excellent |
| B | Excellent | Excellent | Excellent |
| C | Excellent | Excellent | Excellent |
| D | Excellent | Excellent | Excellent |

EXAMPLE 5

Formulations A-D were evaluated for medium term stability over a four day period. The viscosity of the formulations was evaluated on a Brookfield Viscometer at varying temperature using a number 4 spindle at 20 rpm upon mixing and at four days after mixing. The results are shown below in Table 5.

TABLE 5

| Formulation | Initial (CPS, 25° C.) | After 4 Days @ 25° C. (CPS, 25° C.) | After 4 Days @ 43° C. (CPS, 25° C.) |
|---|---|---|---|
| A | 7360 | 9380 | 8850 |
| B | 7390 | 9270 | 7380 |
| C | 9310 | 11740 | 11240 |
| D | 620 | 470 | 500 |

EXAMPLE 6

Formulation A was examined for extended stability and performance. The viscosity was measured on a Brookfield Viscometer with a number 5 spindle at 20 rpm initially upon mixing and at 90 days. The results are shown below in Table 6A.

TABLE 6A

| | Viscosity Over 90 Day Period | |
|---|---|---|
| Formulation | Initial (CPS, 25° C.) | After 90 Days @ Ambient Temp. (CPS, 25° C.) |
| A | 1500–2000 | 4500 |

Formulation A was tested for performance at 100 days after preparation. Three automobile interior panels were sprayed with Formulation A and dried at room temperature for about 30 minutes and an additional 5 minute bake at 150° F. After about 2.5 hours, heated vinyl was vacuum applied under conditions identified below in Table 6B. Edges were also mechanically turned and pressure applied.

TABLE 6B

| | Vinyl Application Conditions | |
|---|---|---|
| Panels | Vinyl Temp. (°F.) | Vacuum Pressure (%) |
| 1 | 330 | 75 |
| 2 | 334 | 73 |
| 3 | 331 | 75 |

At between one and two hours after application, the edge turns were examined for adhesion and on Panels 1 and 2, a Hunter Peel test as discussed above in Example 3 was conducted. Panel 3 was visually examined for smoothness of application. The results of these tests are shown below in Table 6C.

TABLE 6C

| | | Initial Performance | |
|---|---|---|---|
| Panel | Edge Turns | Hunter Peel (lbs linear inch @ 75° F.) | Application Smoothness |
| 1 | very good | 10–12 | — |
| 2 | very good | 11–12 | — |
| 3 | very good | — | very good |

The panels were kept at room temperature for 72 hours and then kept at 100% relative humidity and 100° F. for 24 hours. Hunter Peels were conducted on a portion of each panel with peel values at 75° F. of 9–10 lbs linear inch for all three.

The panels were then kept for 7 days at 180° F. and Hunters Peels were conducted on all three panels at 180° F. and at room temperature. In the 180° F. peels, all three panels had peel values of 5–7 lbs per linear inch. In the room temperature peels, the vinyl tore on all panels.

As can be seen from Examples 2–4, adhesive formulations of the present invention have excellent adhesive properties and provide strong adhesion with good heat resistance. Examples 5 and 6 demonstrate that formulations in accordance with the present invention are highly stable and are usable as one pack adhesive formulations.

Therefore, what is claimed is:

1. A stable water-based adhesive composition, comprising:
    (a) a vinyl acetate polymer;
    (b) an ionic water-dispersed polyurethane containing anionic salt groups or cationic salt groups;
    (c) an aziridine; and
    (d) wherein said composition is substantially free of potentiometrically titratable acid.

2. A composition as claimed in claim 1, wherein the milliequivalents of potentiometrically titratable acid in said composition is less than about 0.2.

3. A composition as claimed in claim 1, wherein said aziridine is present in the composition at a concentration of between about 0.5 weight percent and about 9 weight percent based on total weight of resin solids.

4. A composition as claimed in claim 1, wherein said composition is stable for at least about 30 days at 23° C.

5. A composition as claimed in claim 1, wherein said aziridine is trimethylolpropane-tris-(B-(N-aziridinyl)-propionate).

6. A composition as claimed in claim 1, further comprising butyl benzene sulfonamide.

7. A composition as claimed in claim 1, further comprising a carbodiimide.

8. A composition as claimed in claim 1, further comprising propylene glycol.

9. A stable, low temperature-cure water-based adhesive composition, comprising:
   (a) between about 8 weight percent and about 48 weight percent of a vinyl acetate homopolymer based on weight of resin solids;
   (b) between about 24 weight percent and about 64 weight percent of an ionic water dispersed polyurethane containing anionic salt groups or cationic salt groups based on weight of resin solids;
   (c) between about 0.5 weight percent and about 9 weight percent of a polyfunctional aziridine curing agent based on weight of resin solids;
   (d) between about 7 weight percent and about 33 weight percent of butyl benzene sulfonamide based on weight of resin solids; and
   (e) wherein the milliequivalents of potentiometrically titratable acid in said composition is less than about 0.2.

10. A composition as claimed in claim 9, wherein said composition is stable for at least about 30 days at 23° C.

11. A composition as claimed in claim 9, further comprising a carbodiimide.

12. A composition as claimed in claim 9, further comprising propylene glycol.

13. A process for adhering a thermoplastic material to a rigid substrate, comprising:

(a) applying a water-based composition to said substrate, wherein said composition comprises;
   (i) a vinyl acetate polymer;
   (ii) an anionic salt group-containing water dispersed polyurethane;
   (iii) an aziridine; and
   (iv) wherein said composition is substantially free of potentiometrically titratable acid;
(b) drying said composition;
(c) heating said thermoplastic material;
(d) contacting said thermoplastic material to said dried composition;
(e) applying a vacuum to said thermoplastic material and said substrate for at least about 10 seconds so as to adhere said thermoplastic material to said substrate.

14. A process as claimed in claim 13, wherein said thermoplastic material is heated to between about 110° F. and about 180° F.

15. A process as claimed in claim 13, wherein said thermoplastic material is polyvinyl chloride.

16. A process as claimed in claim 13, wherein the milliequivalents of potentiometrically titratable acid in said composition is less than about 0.2.

17. A process as claimed in claim 13, wherein said composition further comprises butyl benzene sulfonamide.

18. A process as claimed in claim 13, wherein said composition further comprises a carbodiimide.

19. A process as claimed in claim 13, wherein said composition further comprises propylene glycol.

20. A process as claimed in claim 13, wherein said substrate is selected from the group consisting of acrylonitrile-butadiene-styrene terpolymer substrates and fiberboard substrates.

* * * * *